United States Patent
Wang

(10) Patent No.: US 8,400,663 B2
(45) Date of Patent: Mar. 19, 2013

(54) IMAGE PROCESSING DEVICE, IMAGE FORMING DEVICE AND METHOD FOR PROCESSING IMAGE TO EXECUTE A JOB BY HAVING A COUNTER NUMBER

(75) Inventor: Yongning Wang, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 285 days.

(21) Appl. No.: 12/917,094

(22) Filed: Nov. 1, 2010

(65) Prior Publication Data

US 2011/0134467 A1   Jun. 9, 2011

(30) Foreign Application Priority Data

Dec. 8, 2009   (JP) .............................. P2009-278575

(51) Int. Cl.
 *G06F 3/12*   (2006.01)

(52) U.S. Cl. ..................................... 358/1.15; 358/1.13

(58) Field of Classification Search .................. 358/1.15, 358/1.13
See application file for complete search history.

(56) References Cited

U.S. PATENT DOCUMENTS

2009/0091777 A1*   4/2009   Sato et al. .................... 358/1.13
2010/0118332 A1*   5/2010   Nakata ......................... 358/1.15

FOREIGN PATENT DOCUMENTS

JP   2004-272390 A   9/2004

OTHER PUBLICATIONS

Machine translation for JP2004-272390, IDS.*

* cited by examiner

*Primary Examiner* — Qian Yang
(74) *Attorney, Agent, or Firm* — Nath, Goldberg & Meyer; Jerald L. Meyer; Sanjana Mangalagiri

(57) ABSTRACT

An image processing device, an image forming device, and a method for processing image for: separating a first print job into a first piece of job setting information and a first piece of image information; having the first piece of job setting information and the second piece of image information associated with each other to store in a memory; generating a second piece of job setting information of a second print job as a new piece of job setting information according to a setting change with respect to the first print job stored in the memory and associating the second piece of job setting information as generated with the piece of first image information to store in the memory; and transmitting a piece of job setting information of a print job to be executed and a piece of image information associated with the piece of job setting information.

3 Claims, 6 Drawing Sheets

| JOB SETTING INFORMATION OF JOB J1 |
| JOB SETTING INFORMATION OF JOB J2 |
| JOB SETTING INFORMATION OF JOB J3 |
| JOB SETTING INFORMATION OF JOB J4 |

| PAGE INFORMATION OF JOB J1(J3) | COUNTING NUMBER C1(C3)=2 |
| PAGE INFORMATION OF JOB J2 | COUNTING NUMBER C2=1 |
| PAGE INFORMATION OF JOB J4 | COUNTING NUMBER C4=1 |

| IMAGE DATA OF JOB J1(J3) | COUNTING NUMBER C1(C3)=2 |
| IMAGE DATA OF JOB J2 | COUNTING NUMBER C2=1 |
| IMAGE DATA OF JOB J4 | COUNTING NUMBER C4=1 |

FIG. 5

```
┌─────────────────────────────────────────────────────────┐
│ BOX JOB              [ CLOSE ]  [ SAVE ]  [◆ PRINT]     │
│                                                         │
│                              ┌─────────────┐ ┌──────┐   │
│  ┌───────┐┌───────┐┌────────┐│  NUMBER OF  │ │ 1234 │   │
│  │PROPERTY││SETTING││THUMBNAIL││PRINT COPIES │ │      │   │
│  │       ││ LIST  ││        │└─────────────┘ └──────┘   │
│                                                         │
│  JOB NAME  [ J4              ]                          │
│  OWNER NAME : A          PAGES : 4                      │
│  SAVE DATE                              REGULAR         │
│  AND TIME : 2009/05/01 12:30  SHEET SETUP: A4  SHEET    │
│                                                         │
│  IMAGE-ADJUSTMENT           SHEET TRAY                  │
│   ┌─────────────────────┐   ┌───────────────────────┐   │
│   │ FRONT ⇕10.5mm⇔ 0.0mm│   │       REGULAR SHEET   │   │
│   │ SIDE                │   │ 1 A4  (STANDARD)      │   │
│   │ BACK  ⇕0.5mm ⇔10.5mm│   │                       │   │
│   │ SIDE                │   └───────────────────────┘   │
│   └─────────────────────┘                               │
│  PRINT DENSITY                                          │
│   ┌──┐┌──┐┌──┐┌──┐┌──┐                                  │
│   │-2││-1││ 0││+1││+2│                                  │
│   └──┘└──┘└──┘└──┘└──┘                                  │
└─────────────────────────────────────────────────────────┘
```

31 — IMAGE-ADJUSTMENT area
32 — SHEET TRAY area
33 — PRINT DENSITY area
30 — screen

FIG. 6

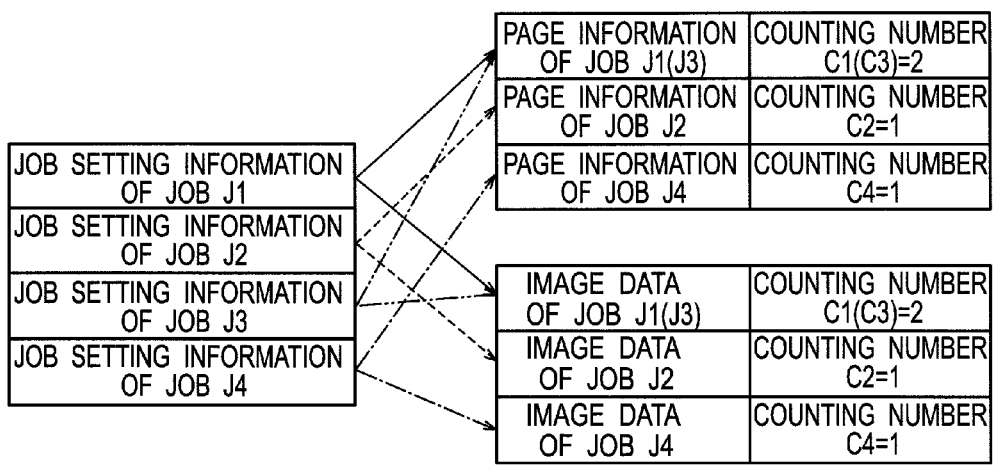

IMAGE PROCESSING DEVICE, IMAGE FORMING DEVICE AND METHOD FOR PROCESSING IMAGE TO EXECUTE A JOB BY HAVING A COUNTER NUMBER

CROSS REFERENCE TO RELATED APPLICATION

This application is based upon and claims the benefit of priority from the prior Japanese Patent Application No. 2009-278575, filed on Dec. 8, 2009, the entire contents of which are incorporated herein by reference.

BACKGROUND OF THE INVENTION

1. Field of the Invention

The present invention relates to an image processing device, an image forming device, and a method for processing image, to execute a print job.

2. Description of the Related Art

Recently, most printers have a large-capacity recording media such as a hard disk. Such a printer temporarily stores a print job in a recording media to execute the stored print job in response to a direction from a user. The printer can also keep the previously executed print job stored without deleting to resubmit the previously executed print job in response to a direction from a user. Such a printer is described in Japanese Patent Application Laid-open Publication No. 2004-272390.

The print job contains a piece of job setting information representing a setting content of printing conditions of the print job, a set of image data, and a piece of page information representing a piece of specific information per page of the set of image data.

When a user changes a setting of printing conditions with respect to a stored print job to execute a print job with the changed setting, the related printers as described above copy the entire data of the stored print job change a content of a job setting information of the copied print job, and store the changed print job as a new file.

SUMMARY OF THE INVENTION

The size of a print job tends to be large because the print job contains a set of image data therein. Therefore, copying the entire print job for a change of the setting of the printing conditions as described above results in large volume use of the recording medium to decrease usability of the recording medium.

An object of the present invention is to provide an image processing device, an image forming device, and a method for processing image capable of avoiding a decrease in usability of a recording medium to store print jobs.

A first aspect of the present invention is an image processing device comprising: a separator configured to separate a first print job into a first piece of job setting information and a first piece of image information; a storage processing section configured to have the first piece of job setting information and the first piece of image information associated with each other to store in a memory; a setting change section configured to generate a second piece of job setting information of a second print job as a new piece of job setting information according to a setting change with respect to the first print job stored in the memory and have the second piece of job setting information as generated associated with the first piece of image information to store in the memory; and a transmitter configured to transmit, to an image forming device, a piece of job setting information of a print job to be executed and a piece of image information associated with the piece of job setting information to be executed.

According to the first aspect, a decrease in usability of the recording medium to store print jobs can be avoided.

In the first aspect, the storage processing section may be configured to: have a counting number representing a number of pieces of job setting information associated with a piece of image information associated with the piece of image information to store in the memory; delete a piece of job setting information corresponding to a print job to be deleted and decrement a counting number of a piece of image information associated with the piece of job setting information as deleted; and delete a piece of image information with a counting number being zero.

According to the above-described configuration, a piece of image information shared by print jobs can be deleted from the recording medium properly.

A second aspect of the present invention is an image forming device comprising: a separator configured to separate a first print job into a first piece of job setting information and a first piece of image information; a storage processing section configured to have the first piece of job setting information and the first piece of image information associated with each other to store in a memory; a setting change section configured to generate a second piece of job setting information of a second print job as a new piece of job setting information according to a setting change with respect to the first print job stored in the memory and have the second piece of job setting information as generated associated with the first piece of image information to store in the memory; and an image forming unit configured to form image based on a piece of job setting information of a print job to be executed and a piece of image information associated with the piece of job setting information.

According to the second aspect, a decrease in usability of the recording medium to store print jobs can be avoided.

In the second aspect, the storage processing section is configured to: have a counting number representing a number of pieces of job setting information associated with a piece of image information with the piece of image information to store in the memory; delete a piece of job setting information corresponding to a print job to be deleted and decrement a counting number of a piece of image information associated with the piece of job setting information as deleted; and delete a piece of image information with a counting number being zero.

According to the above-described configuration, a piece of image information shared by print jobs can be deleted from the recording medium properly.

A third aspect of the present invention is a method for processing image, the method comprising: separating a first print job into a first piece of job setting information and a first piece of image information; having the first piece of job setting information and the second piece of image information associated with each other to store in a memory; generating a second piece of job setting information of a second print job as a new piece of job setting information according to a setting change with respect to the first print job stored in the memory and having the second piece of job setting information as generated associated with the piece of first image information to store in the memory; and transmitting, to an image forming device, a piece of job setting information of a print job to be executed and a piece of image information associated with the piece of job setting information.

According to the third aspect, a decrease in usability of the recording medium to store print jobs can be avoided.

The method may further comprise: having a counting number representing a number of pieces of job setting information associated with a piece of image information associated with the piece of image information to store in the memory; deleting a piece of job setting information corresponding to a print job to be deleted and decrementing a counting number of a piece of image information associated with the piece of job setting information as deleted; and deleting a piece of image information with a counting number being zero.

According to the above-described configuration, a piece of image information shared by print jobs can be deleted from the recording medium properly.

BRIEF DESCRIPTION OF THE DRAWINGS

FIG. 5 is a diagram illustrating an example of a details display window.

FIG. 6 is a diagram illustrating an example of a correspondence relationship between pieces of job setting information and pieces of image information after a change in a setting of printing conditions of a print job stored in the memory.

DETAILED DESCRIPTION OF THE EMBODIMENT

Figure 1:
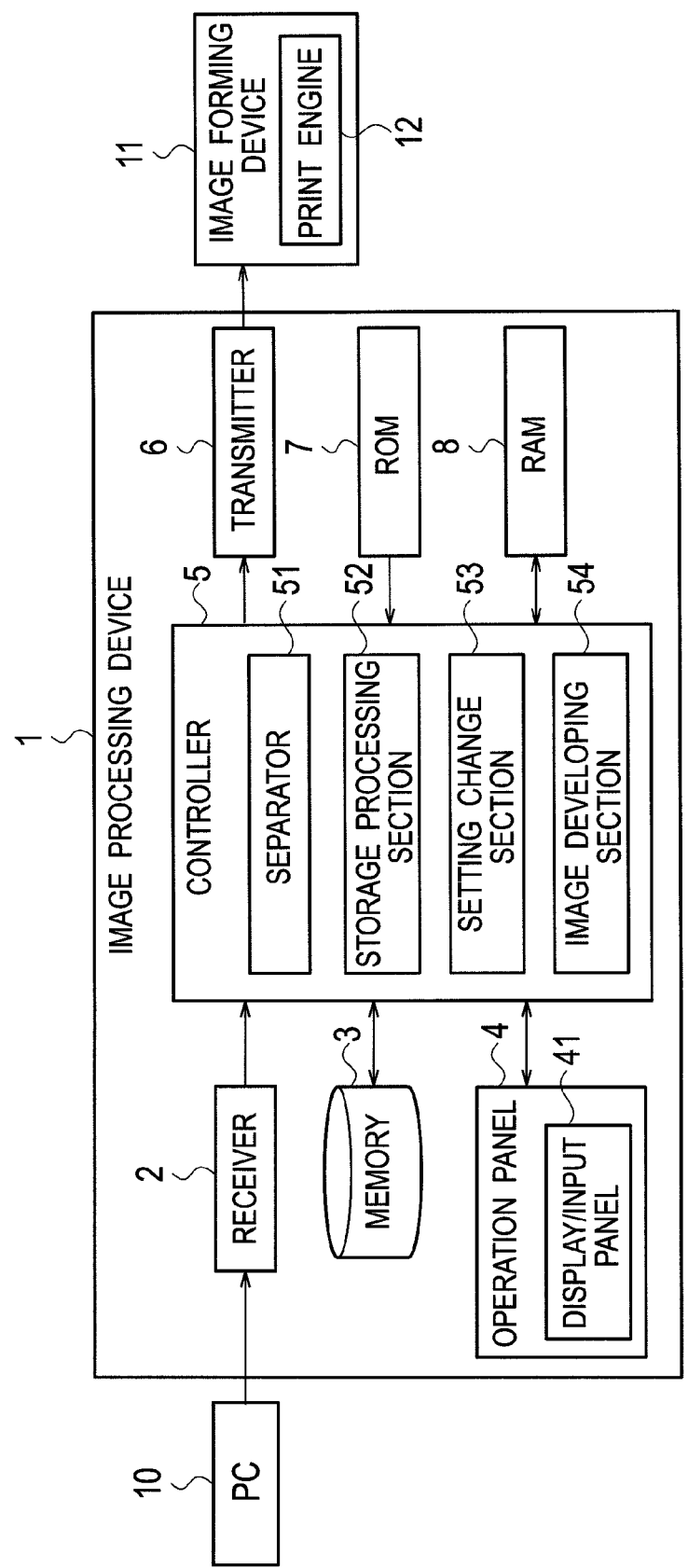
FIG. 1 is a block diagram illustrating a configuration of an image processing device according to an embodiment of the present invention.

Hereinafter, a description will be made below in detail of an embodiment of the present invention with reference to the drawings. In the embodiment, the same or similar members and elements will be indicated by the same or similar reference numerals throughout the drawings. The explanations with regard to those members and elements will not be repeated or will be simply described.

Image Processing Device

FIG. 1 is a block diagram illustrating a configuration of an image processing device 1 according to the embodiment of the present invention. The image processing device 1 according to the embodiment illustrated in FIG. 1 includes a receiver 2, a memory 3, an operation panel 4, a controller 5, a transmitter 6, a ROM (Read Only Memory) 7 and a RAM (Random Access Memory) 8.

The receiver 2 receives print jobs from a personal computer (PC) 10 connected to the image processing device 1 via, for example, a LAN (Local Area Network).

The memory 3 contains a large-capacity recording medium such as a hard disk. The memory 3 has a piece of job setting information and a piece of image information of a print job separated by a separator 51 described later associated with each other to store therein for print jobs. The piece of image information includes a piece of page information and a set of image data.

The operation panel 4 includes a display/input panel 41, and various operation keys (not shown in the figure). The operation panel 4 accepts a user's operation and outputs an operation signal based on the user's operation to the controller 5.

The display/input panel 41 includes a pressure-sensitive or electrostatic transparent touch panel (not shown in the figure) arranged in a front surface thereof, and a liquid crystal display panel (not shown in the figure) arranged on a reverse side of the touch panel. A user directly touches a surface of the touch panel with fingers, for example, while seeing a display window of the liquid crystal display panel to operate the touch panel.

The controller 5 is composed of a CPU (Central Processing Unit) to execute various computing processing and data input/output processing and the like. The controller 5 executes processing according to a control program to control the entire operation of the image processing device 1.

The controller 5 also functions as the separator 51 and a storage processing section 52. The separator 51 divides a print job received in the receiver 2 into a piece of job setting information and a piece of image information. The storage processing section 52 has the piece of job setting information and the piece of image information of the print job as separated associated with each other to store in the memory 3.

The controller 5 also functions as a setting change section 53 and an image developing section 54. The setting change section 53 works in response to a setting change with respect to a print job stored in the memory 3 directed by a user's operation through the operation panel 4 to generate a new piece of job setting information according to the user's direction for the setting change and have the new piece of job setting information as generated associated with a piece of image information corresponding to the print job of which the setting change is directed by the user to store in the memory 3. The image developing section 54 develops a set of image data when executing a print job.

The transmitter 6 transmits a piece of job setting information and a piece of image information of a print job to be executed to an image forming device 11. The image forming device 11 receives the print job and then forms image on a print medium with a print engine 12 based on the received print job.

The ROM 7 stores programs such as a control program for the operations of the controller 5. The RAM 8 stores data temporarily and functions as a work area for calculation by the controller 5.

The following are explanations of operations of the image processing device 1.

The receiver 2 receives a print job from the PC 10 and outputs the print job to the controller 5.

Figure 2A:
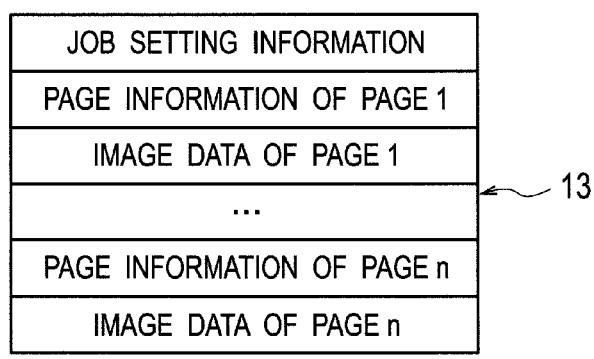
FIG. 2A is a diagram illustrating an example of a data configuration of a print job.

FIG. 2A is a diagram illustrating an example of a data configuration of a print job. As illustrated in FIG. 2A, a print job 13 contains a piece of job setting information positioned in the top of a file, followed by a piece of page information and a set of image data per page alternately. Hereinafter, the piece of page information and the set of image data are referred to as a piece of image information.

The job setting information contains a setting content of printing conditions of a print job, such as a print sheet size, an image positioning, and a print density. The page information is information regarding a set of image data per page, such as a size of an effective image area and a color attribute (monochrome or colored).

Figure 2B:
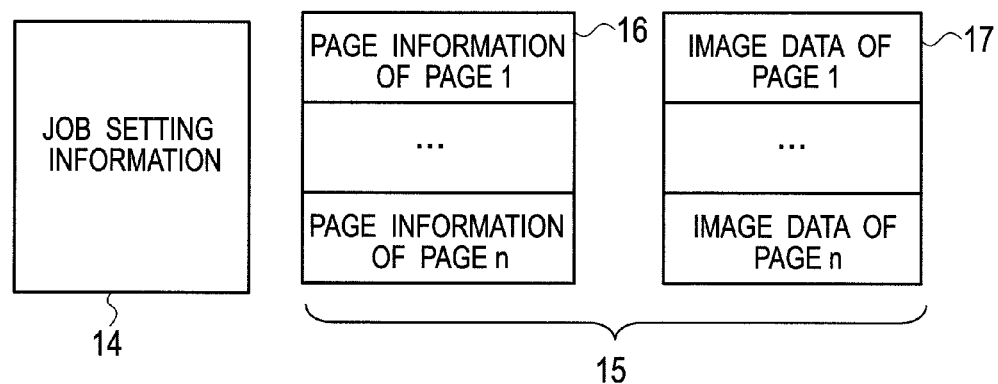
FIG. 2B is a diagram illustrating a print job as separated.

The separator 51 separates a print job input from the receiver 2 into a piece of job setting information 14 and a piece of image information 15, as shown in FIG. 2B. The separator 51 further separates the piece of image information 15 into a piece of page information 16 and a set of image data 17.

The storage processing section 52 assigns a unique job ID to the piece of job setting information 14 of the print job separated by the separator 51 to store in the memory 3. The storage processing section 52 also, for example, assigns a file name searchable by use of the job ID to the piece of page information 16 and the set of image data 17 corresponding to the piece of job setting information 14 and has the piece of page information 16 and the set of image data 17 associated with the piece of job setting information 14 to store in the memory 3.

The storage processing section 52 also has a counting number representing the number of pieces of job setting information associated with a piece of page information 16 and a set of image data 17, associated with the same piece of page information 16 and the same set of image data 17 to store in the memory 3.

Figures 3, 4:
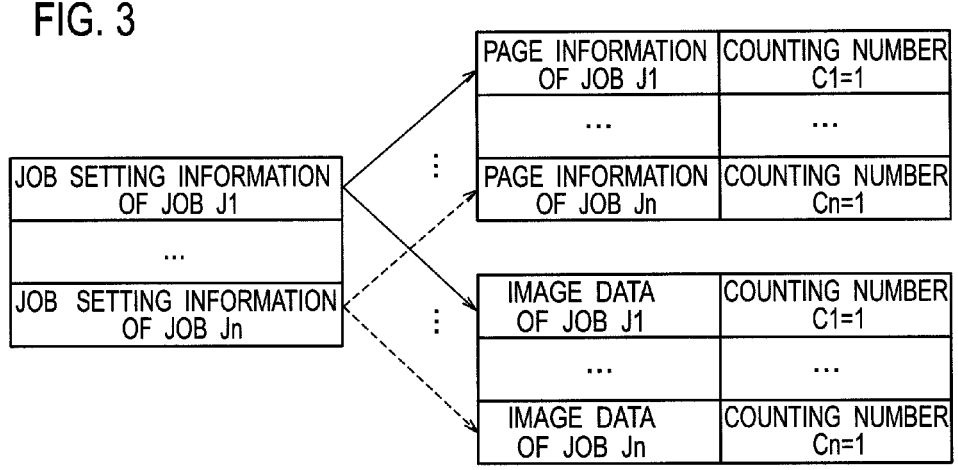
FIG. 3 is a conceptual diagram illustrating a print job stored in a memory.
FIG. 4 is a diagram illustrating an example of a job list window.

FIG. 3 is a conceptual diagram illustrating the print job stored in the memory 3 through the procedures of separation and storage processing described above. In FIG. 3, all the pieces of page information and the sets of image data correspond to the respective piece of job setting information on one-to-one. Thus, the respective counting numbers C1, . . . , Cn of all the pieces of page information and the sets of image data are "1".

FIG. 4 is a diagram illustrating an example of a job list window through which a user selects a print job to be executed from print jobs stored in the memory 3. The user selects a desired print job from a job list display 21 of a job list window 20 displayed on the display/input panel 41, to direct execution of the desired print job.

When the user specifies the desired print job from the job list display 21 and selects a details display button 22 in the job list window 20, the controller 5 displays a details display window 30 illustrated in FIG. 5 on the display/input panel 41. The details display window 30 enables the user to confirm a content of the piece of job setting information.

When the user changes the setting of the printing conditions of the specified print job, the user directs various setting changes with buttons such as an image positioning adjustment button 31, a sheet setting button 32, and a print density adjustment button 33 on the details display window 30.

After the direction of the setting change of the print job by the user, the setting change section 53 generates a new piece of job setting information representing a setting content according to the direction of the setting change. Then, the setting change section 53 has the piece of new job setting information associated with the piece of image information (a piece of page information and a set of image data) corresponding to the print job for which the setting change has been directed to store in the memory 3.

For example, as illustrated in FIG. 6, when a setting change of printing conditions of a job J1 is directed, the setting change section 53 generates a piece of job setting information of a job J3 as a new piece of job setting information. Then, the setting change section 53 has the piece of job setting information of the job J3 associated with the piece of page information and the set of image data of the job J1 to store in the memory 3.

The piece of page information and the set of image data of the job J1 are associated with the two pieces of job setting information J1 and J3. Therefore, the counting number C1 (C3) of the piece of page information and the set of image data of the job J1 (J3) becomes "2".

When the execution of the job J3 is directed by the user's operation, the controller 5 retrieves, from the memory 3, the piece of job setting information of the job J3 and the piece of page information and the set of image data of the job J1 (J3) associated with the piece of job setting information of the job J3. Then, the controller 5 develops the retrieved set of image data by the image developing section 54, and transmits the piece of job setting information of the job J3 and the piece of page information and the developed set of image data of the job J1 (J3) to the image forming device 11 via the transmitter 6. The image forming device 11 then forms image with the print engine 12.

The user specifies a certain print job from the job list display 21 and selects a delete button 23 in the job list window 20 to direct a deletion of the specified print job stored in the memory 3. For the deletion of the print job, the counting number is utilized.

For example, when a deletion of the job J1 is directed in FIG. 6, the storage processing section 52 deletes the piece of job setting information of the job J1 from the memory 3 and decrements by one the counting number C1 (C3) of the piece of page information and the set of image data of the job J1 (J3) associated with the piece of job setting information of the job J1.

Figure 7:
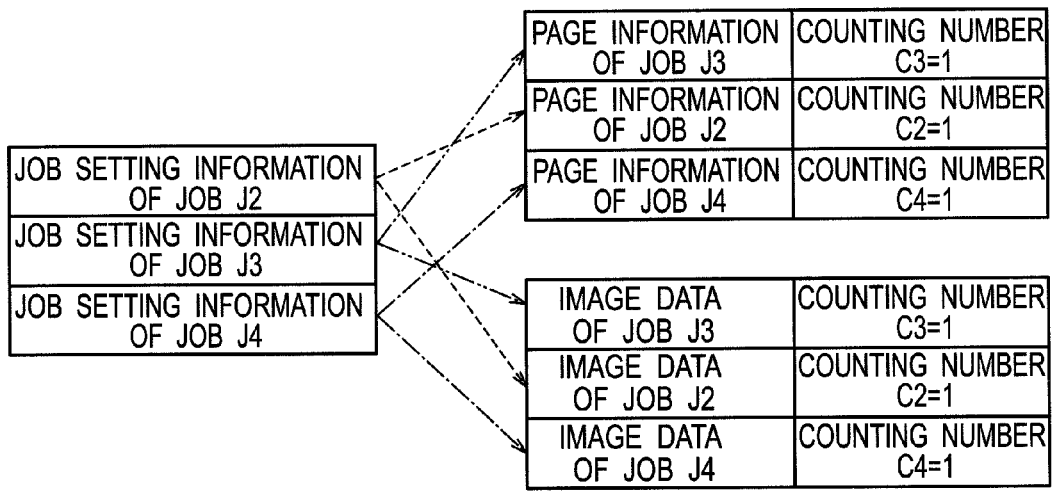
FIG. 7 is a diagram illustrating a condition in which one print job is deleted from FIG. 6.

FIG. 7 shows a condition after such processing. The piece of job setting information of the job J1 is deleted in FIG. 7. However, the piece of page information and the set of image data of the job J1 (J3) associated with the piece of job setting information of the job J1 and also the job J3 are kept stored in the memory 3 as the piece of page information and the set of image data of the job J3. Therefore, the counting number C3 of the piece of page information and the set of image data of the job J3 becomes "1".

Figure 8:
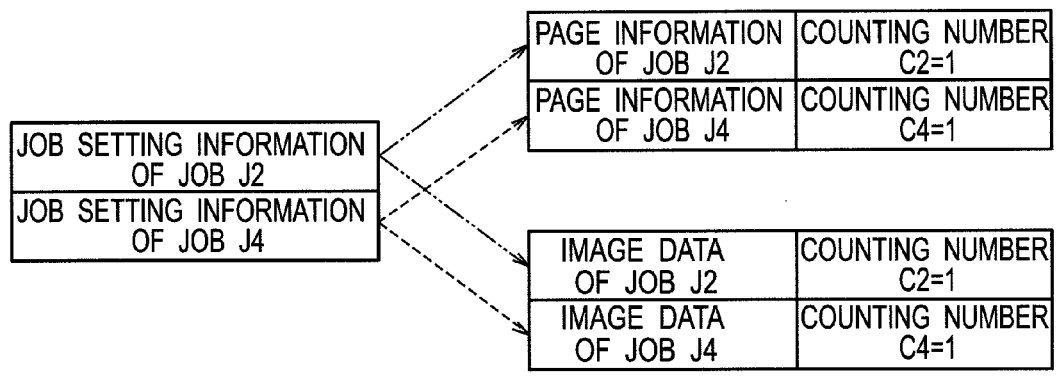
FIG. 8 is a diagram illustrating a condition in which another print job is deleted from FIG. 7.

When a deletion of the job J3 is directed in FIG. 7, the storage processing section 52 deletes the piece of job setting information of the job J3 from the memory 3 and decrements by one the counting number C3 of the piece of page information and the set of image data of the job J3. When the counting number C3 becomes zero due to such processing, the storage processing section 52 deletes the piece of page information and the set of image data of the job J3 from the memory 3. FIG. 8 shows a condition after such processing.

According to the image processing device 1 of the present embodiment described above, when the direction is made with respect to the setting change of the printing conditions of the print job stored in the memory 3, only the piece of job setting information is newly generated according to the direction of the setting change while the piece of page information and the set of image data originally stored in the memory 3 are used for the print job to execute the print job. Therefore, in the image processing device having a function that calls up a print job previously executed to resubmit (i.e. a box function) or a function that temporarily stores a print job to execute in response to a direction from a user, a setting of printing conditions is changed without a set of image data and a piece of page information with large data sizes being copied. Accordingly, less amounts of data are stored in the recording medium in the memory 3 to avoid the decrease in usability of the recording medium.

According to the present embodiment, the piece of page information and the set of image data shared in the print jobs can be deleted adequately by use of the counting numbers.

The setting change of the printing conditions with respect to the stored print job may be directed through a printer driver of the PC 10.

Image Forming Device

Figure 9:
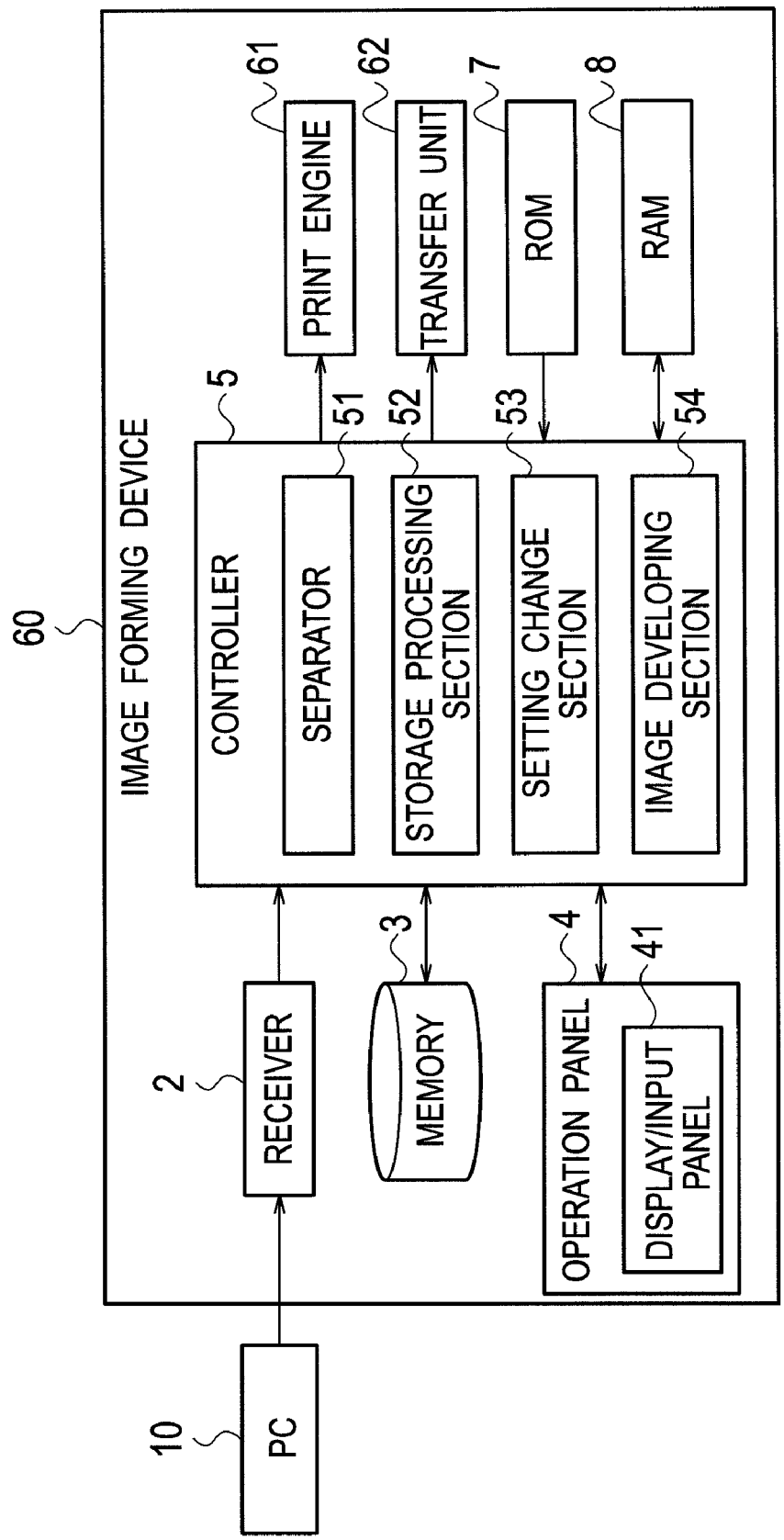
FIG. 9 is a block diagram illustrating a configuration of an image forming device according to an embodiment of the present invention.

FIG. 9 is a block diagram illustrating a configuration of an image forming device according to the embodiment of the present invention. An image forming device 60 according to the present embodiment shown in FIG. 9 includes a print engine (image forming unit) 61 to form image on a print medium and a transfer unit 62 to transfer a print medium, in addition to the components included in the above-described print processing device 1 except for the transmitter 6.

Since the respective operations such as separation, storage, and deletion of each print job in the image forming device 60 are similar to those in the image processing device 1, the explanations thereof are not repeated.

When a certain print job is executed, the controller 5 retrieves, from the memory 3, a piece of job setting information of the print job to be executed and a piece of page information and a set of image data associated with the piece of job setting information and, develops the set of image data by the image developing section 54. Then, based on the piece of job setting information, the piece of page information and the developed set of image data, the controller 5 drives the print engine 61 to form image on a print medium transferred by the transfer unit 62.

The image forming device 60 as described above can also achieve similar effects to the image processing device 1.

An image processing device, an image forming device, and a method for processing image according to the embodiment of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiment of the present invention are only a list of optimum effects achieved by the present invention. Hence, the effects of the present invention are not limited to those described in the embodiment of the present invention.

What is claimed is:

1. An image processing device comprising:
a separator configured to separate a first print job into a first piece of job setting information and a first piece of image information;
a storage processing section configured to have the first piece of job setting information and the first piece of image information associated with each other to store in a memory;
a setting change section configured to generate a second piece of job setting information of a second print job as a new piece of job setting information according to a setting change with respect to the first print job stored in the memory and have the second piece of job setting information as generated associated with the first piece of image information to store in the memory; and
a transmitter configured to transmit, to an image forming device, a piece of job setting information of a print job to be executed and a piece of image information associated with the piece of job setting information to be executed;
wherein the storage processing section is configured to have a counting number representing a number of pieces of job setting information associated with a piece of image information associated with the piece of image information to store in the memory;
delete a piece of job setting information corresponding to a print job to be deleted and decrement a counting number of a piece of image information associated with the piece of job setting information as deleted; and
delete a piece of image information with a counting number being zero.

2. An image forming device comprising:
a separator configured to separate a first print job into a first piece of job setting information and a first piece of image information;
a storage processing section configured to have the first piece of job setting information and the first piece of image information associated with each other to store in a memory;
a setting change section configured to generate a second piece of job setting information of a second print job as a new piece of job setting information according to a setting change with respect to the first print job stored in the memory and have the second piece of job setting information as generated associated with the first piece of image information to store in the memory; and
an image forming unit configured to form image based on a piece of job setting information of a print job to be executed and a piece of image information associated with the piece of job setting information;
wherein the storage processing section is configured to have a counting number representing a number of pieces of job setting information associated with a piece of image information with the piece of image information to store in the memory;
delete a piece of job setting information corresponding to a print job to be deleted and decrement a counting number of a piece of image information associated with the piece of job setting information as deleted; and
delete a piece of image information with a counting number being zero.

3. A method for processing image, the method comprising:
separating a first print job into a first piece of job setting information and a first piece of image information;
having the first piece of job setting information and the second piece of image information associated with each other to store in a memory;
generating a second piece of job setting information of a second print job as a new piece of job setting information according to a setting change with respect to the first print job stored in the memory and having the second piece of job setting information as generated associated with the piece of first image information to store in the memory;
transmitting, to an image forming device, a piece of job setting information of a print job to be executed and a piece of image information associated with the piece of job setting information; and
having a counting number representing a number of pieces of job setting information associated with a piece of image information associated with the piece of image information to store in the memory;
deleting a piece of job setting information corresponding to a print job to be deleted and decrementing a counting number of a piece of image information associated with the piece of job setting information as deleted; and
deleting a piece of image information with a counting number being zero.

* * * * *